(12) United States Patent
Shin

(10) Patent No.: US 11,454,846 B2
(45) Date of Patent: Sep. 27, 2022

(54) DISPLAY APPARATUS HAVING BACK-LIGHT UNIT AND LIQUID CRYSTAL PANEL

(71) Applicant: LG DISPLAY CO., LTD., Seoul (KR)

(72) Inventor: Nam Jin Shin, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/549,352

(22) Filed: Dec. 13, 2021

(65) Prior Publication Data

US 2022/0206342 A1    Jun. 30, 2022

(30) Foreign Application Priority Data

Dec. 29, 2020 (KR) .................. 10-2020-0186540

(51) Int. Cl.
| | | |
|---|---|---|
| G02F 1/13357 | (2006.01) | |
| G02F 1/13 | (2006.01) | |
| F21V 8/00 | (2006.01) | |

(52) U.S. Cl.
CPC ..... *G02F 1/133615* (2013.01); *G02B 6/0068* (2013.01); *G02B 6/0083* (2013.01); *G02F 1/1323* (2013.01); *G02F 1/133608* (2013.01)

(58) Field of Classification Search
None
See application file for complete search history.

(56) References Cited

U.S. PATENT DOCUMENTS

| | | | |
|---|---|---|---|
| 2017/0329073 A1* | 11/2017 | Liu | ............ G02B 6/0053 |
| 2020/0124886 A1* | 4/2020 | Song | ............ G02B 6/0083 |
| 2021/0294015 A1* | 9/2021 | Yin | ............ G02F 1/13312 |

\* cited by examiner

*Primary Examiner* — Phu Vu
(74) *Attorney, Agent, or Firm* — Polsinelli PC

(57) ABSTRACT

A display apparatus includes a back-light unit including a second light-guide plate disposed on a first light-guide plate and a light-source element; a liquid crystal panel on the second light-guide plate of the back-light unit; a first viewing angle control unit disposed between the first light-guide plate and the second light-guide plate of the back-light unit, the first viewing angle control unit including first light-blocking patterns; and a supporting element disposed between an edge of the first light-guide plate and an edge of the first viewing angle control unit, wherein the light-source element includes a first light-source on a side of the first light-guide plate, a second light-source on a side of the second light-guide plate, and a light-source circuit board in which the first light-source and the second light-source are mounted, and wherein the supporting element is in contact with a surface of the light-source circuit board between the first light-source and the second light-source, thereby preventing deterioration of an image quality due to particles generated during a coupling process of the supporting element.

15 Claims, 7 Drawing Sheets

DISPLAY APPARATUS HAVING BACK-LIGHT UNIT AND LIQUID CRYSTAL PANEL

CROSS-REFERENCE TO RELATED APPLICATION

This application claims the benefit of Korean Patent Application No. 10-2020-0186540 filed on Dec. 29, 2020, which is hereby incorporated by reference in its entirety as if fully set forth herein.

BACKGROUND

Field of the Disclosure

The present disclosure relates to a display apparatus in which a liquid crystal panel is disposed on a back-light unit.

Description of the Background

Generally, a display apparatus is provided to realize an image. For example, the display apparatus may include a liquid crystal panel disposed on a back-light unit. The back-light unit may provide light. The liquid crystal panel may realize the image using the light provided from the back-light unit.

The display apparatus may be used in various places. For example, the display apparatus may be installed in front of a passenger seat of a vehicle. The image realized by the display apparatus may distract the eyes of people around a user, for example a driver. Thus, in the display apparatus, the viewing angle may be selectively limited to prevent accidents due to distract the eyes of the people around the user. For example, the display apparatus may include a back-light unit in which a second light-guide plate is disposed on a first light-guide plate, and a viewing angle control unit disposed between the first light-guide plate and the second light-guide plate of the back-light unit.

The display apparatus may include a supporting element to support the viewing angle control unit and the second light-guide plate. The supporting element may couple with a cover bottom accommodating the light-source element, the first light-guide plate, the second light-guide plate and the viewing angle control unit. For example, at least one coupling hole may be formed in the cover bottom, and a portion of the supporting element may be fastened to the coupling hole of the cover bottom by an interference fitting method. However, in the display apparatus, particles may be generated during a coupling process of the supporting element with the cover bottom. The particles may block light emitted from the back-light unit. Thus, in the display apparatus, the particles may be recognized by the user as a dark spot.

SUMMARY

Accordingly, the present disclosure is directed to a display apparatus that substantially obviates one or more problems due to limitations and disadvantages of the related art.

More specifically, the present disclosure is to provide a display apparatus capable of preventing the deterioration of the image quality due to the coupling process of the supporting element.

The present disclosure is also to provide a display apparatus capable of preventing the particles generated during the coupling process of the supporting element from affecting the realization of the image.

Additional advantages and features of the disclosure will be set forth in part in the description which follows and in part will become apparent to those having ordinary skill in the art upon examination of the following or may be learned from practice of the disclosure. The features and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus comprising a back-light unit. The back-light unit includes a first light-guide plate, a second light-guide plate and a light-source element. The light-source element includes a light-source circuit board in which a first light-source disposed on a side of the first light-guide plate and a second light-source disposed on a side of the second light-guide plate are mounted. A liquid crystal panel is disposed on the second light-guide plate of the back-light unit. A first viewing angle control unit is disposed between the first light-guide plate and the second light-guide plate of the back-light unit. The first viewing angle control unit includes first light-blocking patterns. A supporting element is disposed between an edge of the first light-guide plate and an edge of the first viewing angle control unit. The supporting element is in contact with a surface of the light-source circuit board between the first light-source and the second light-source.

The supporting element may include a metal.

A lower surface of the first viewing angle control unit toward the first light-guide plate may include a region being in contact with the supporting element.

An optical sheet may be disposed between the first light-guide plate and the first viewing angle control unit. An upper surface of the optical sheet toward the first viewing angle control unit may include a region being in contact with the supporting element.

The light-source element may include a first light-source region, a second light-source region and an intermediate region. The first light-source may be mounted in the first light-source region. The second light-source may be mounted in the second light-source region. The intermediate region may be disposed between the first light-source region and the second light-source region. The supporting element may be in contact with the intermediate region of the light-source circuit board. The second light-source region may be spaced away from the intermediate region.

The intermediate region may be in contact with the first light-source region.

The light-source circuit board may further include a connecting region being in contact with a side of the first light-source region and a side of the second light-source region.

A second viewing angle control unit may be disposed between the back-light unit and the liquid crystal panel. The second viewing angle control unit may include second light-blocking patterns. The second light-blocking patterns may extend in a direction perpendicular to the first light-blocking patterns.

In another aspect, there is provided a display apparatus comprising a first light-guide plate. At least one first light-source is disposed on a side of the first light-guide plate. A viewing angle control unit is disposed on the first light-guide plate. The viewing angle control unit includes light-blocking patterns. A second light-guide plate is disposed on the viewing angle control unit. The second light-guide plate overlaps the first light-guide plate. At least one second light-source is disposed on a side of the second light-guide plate. A liquid crystal panel is disposed on the second light-guide plate. A light-source circuit board includes an intermediate region between a first light-source region in which the first light-source is mounted and a second light-source region in which the second light-source is mounted. The intermediate region of the light-source circuit board is in contact with a supporting element. The supporting element extends between an edge of the first light-guide plate and an edge of the viewing angle control unit.

The first light-guide plate, the first light-source, viewing angle control unit, the second light-guide plate, the second light-source, the light-source circuit board and the supporting element may be accommodated in the cover bottom. The cover bottom may include a side wall disposed on a side of the first light-guide plate and a side of the second light-guide plate. The light-source circuit board may be attached to the side wall of the cover bottom by a substrate adhesive layer.

The intermediate region of the light-source circuit board may include at least one coupling hole. The supporting element may include at least one protruding portion which is fastened to the coupling hole of the light-source circuit board.

An element adhesive layer may be disposed between the light-source circuit board and the supporting element. The element adhesive layer may include at least one penetrating hole through which the protruding portion of the supporting element passes.

The supporting element may include an insulating material.

The supporting element may have a bar shape extending along an edge of the viewing angle control unit.

An air-gap may be disposed between the first light-guide plate and the viewing angle control unit. The air-gap may be disposed side by side with the supporting element.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Figure 1:
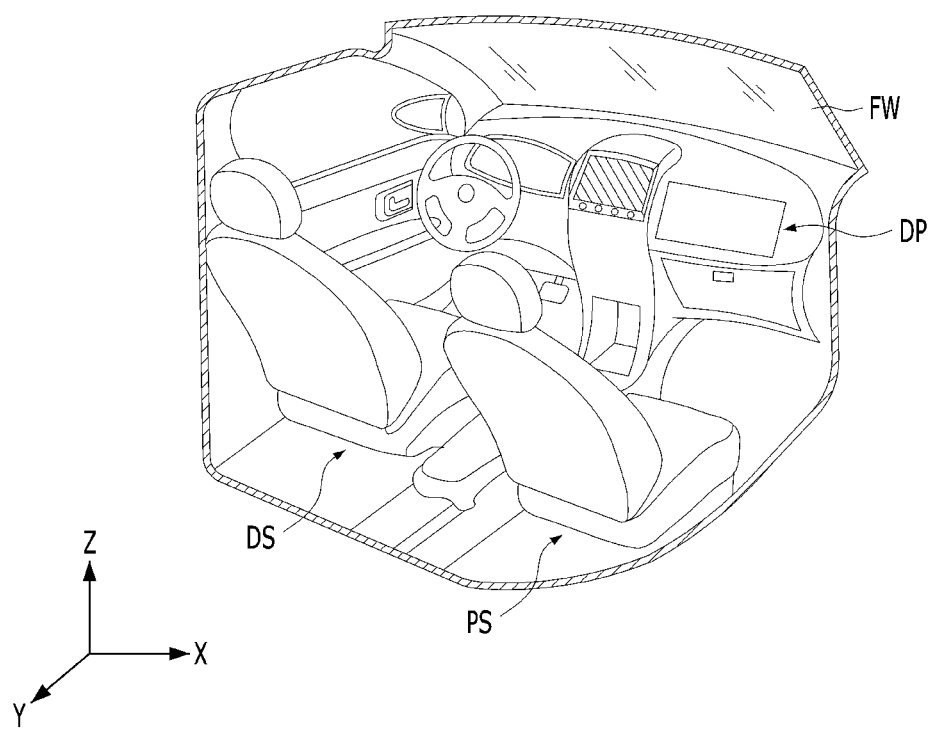
FIG. 1 is a view showing a place where a display apparatus according to an aspect of the present disclosure is used.
Figure 2:
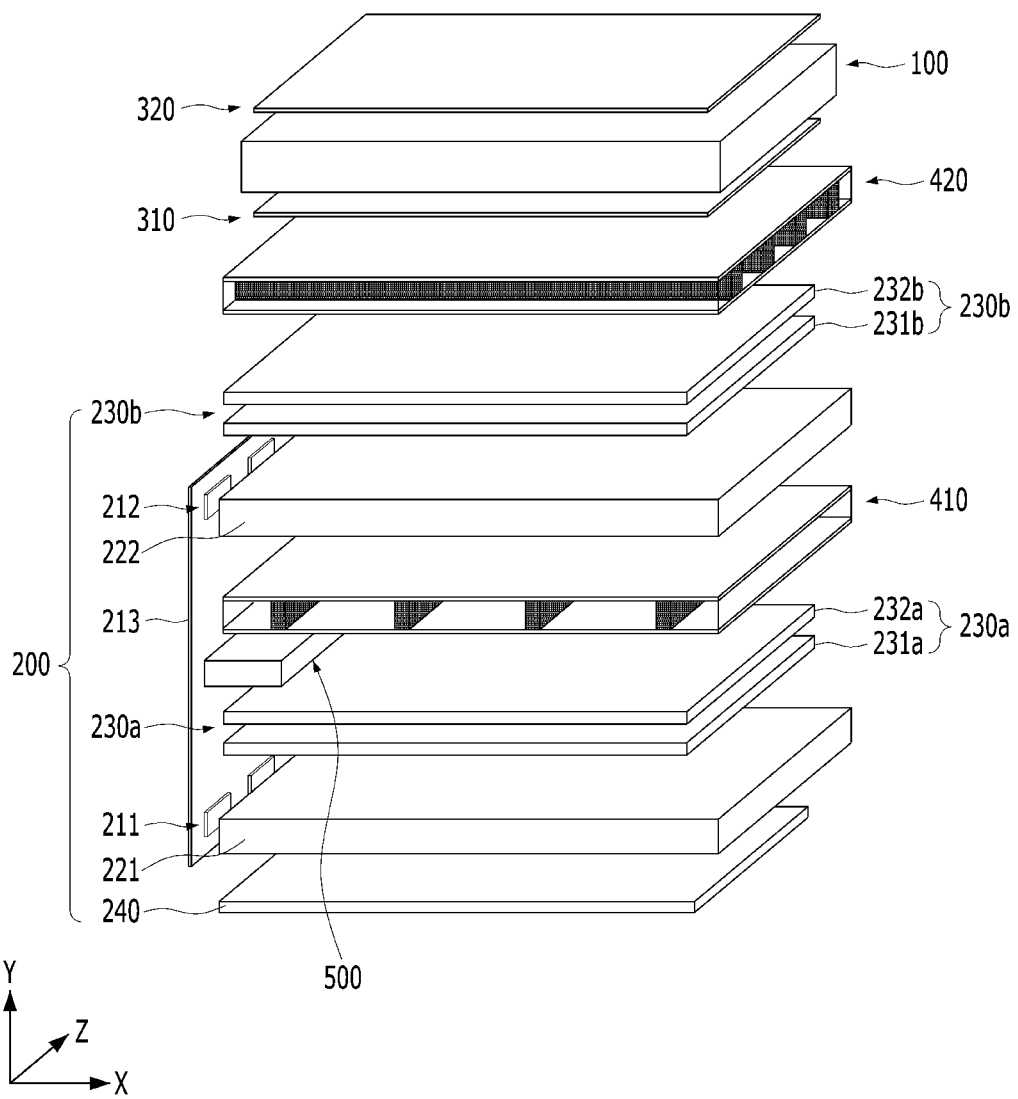
FIG. 2 is a view schematically showing the display apparatus according to the aspect of the present disclosure.
Figure 3:
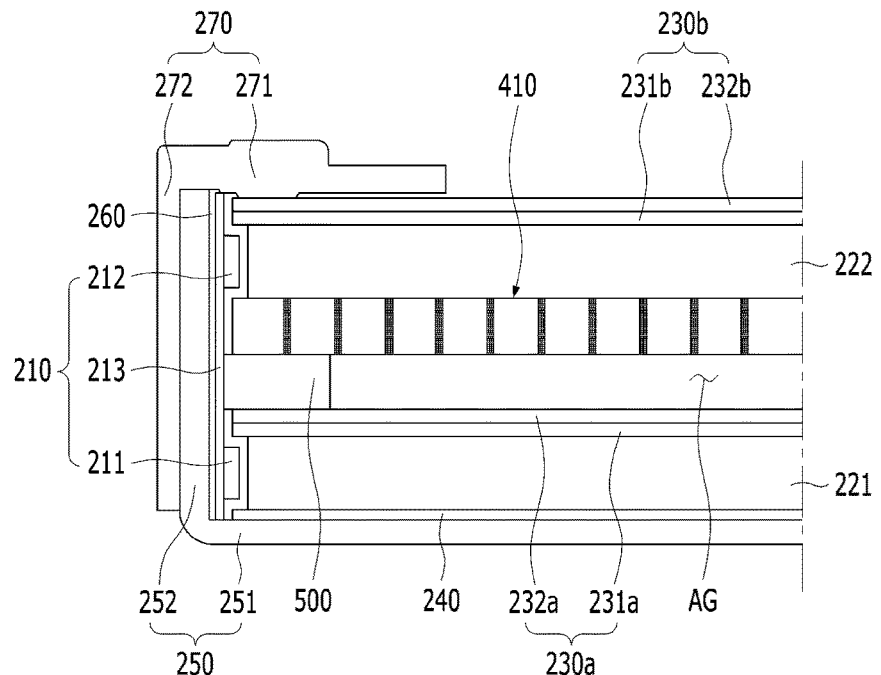
FIG. 3 is a view showing a coupling state of a back-light unit, a first viewing angle control unit and a supporting element of the display apparatus according to the aspect of the present disclosure.
Figure 4:
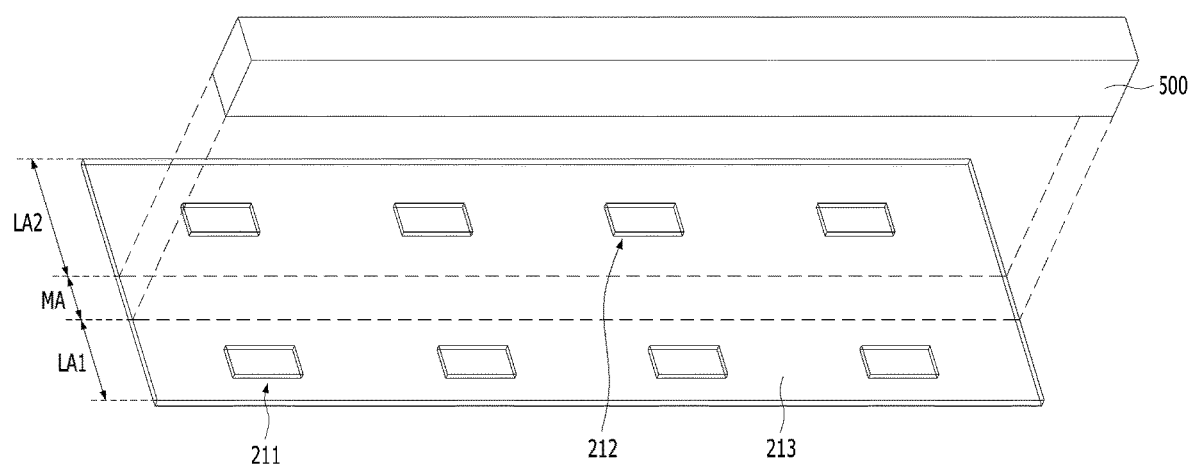
FIG. 4 is a view showing a separating state of a light-source element and a supporting element of the display apparatus according to the aspect of the present disclosure.
Figure 5:
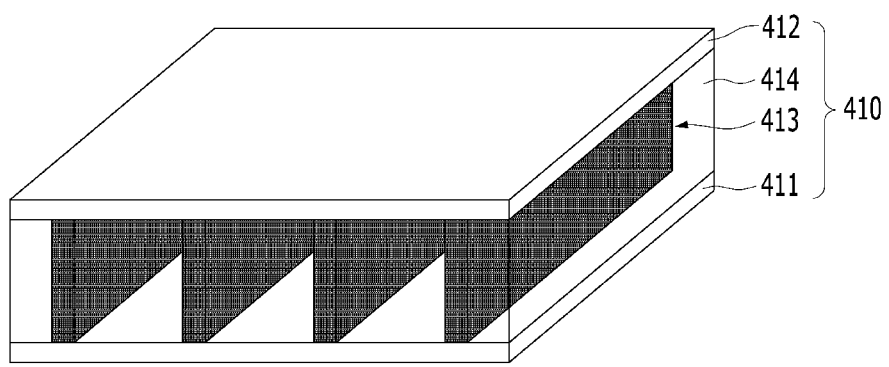
FIG. 5 is a view showing a first viewing angle control unit of the display apparatus according to the aspect of the present disclosure.
Figure 5:
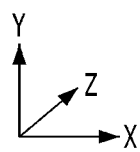
Figure 6:
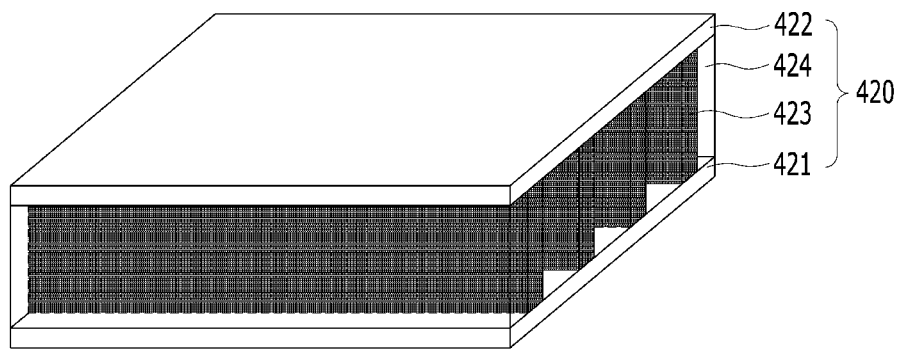
FIG. 6 is a view showing a second viewing angle control unit of the display apparatus according to the aspect of the present disclosure.
Figure 6:
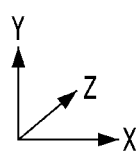

Hereinafter, details related to the above features, technical configurations, and operational effects of the aspects of the present disclosure will be clearly understood by the following detailed description with reference to the drawings, which illustrate some aspects of the present disclosure. Here, the aspects of the present disclosure are provided in order to allow the technical sprit of the present disclosure to be satisfactorily transferred to those skilled in the art, and thus the present disclosure may be embodied in other forms and is not limited to the aspects described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular aspects, and are not intended to limit the scope of the present disclosure. For example, an element described in the singular form is intended to include a plurality of elements unless the context clearly indicates otherwise. In addition, in the specification of the present disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a view showing a place where a display apparatus according to an aspect of the present disclosure is used.

Referring to FIG. 1, the display apparatus DP according to the aspect of the present disclosure may be installed in front of a passenger seat PS of a vehicle. Thus, the display apparatus DP according to the aspect of the present disclosure may prevent accidents caused by the distraction of the driver sitting in the driver's seat DS, by limiting viewing angle while driving of the vehicle. For example, the display apparatus DP according to the aspect of the present disclosure may include a liquid crystal panel 100, a back-light unit 200 and a first viewing angle control unit 410, as shown in FIGS. 2 to 6.

The liquid crystal panel 100 may realize an image provided to a user. For example, the liquid crystal panel 100 may include a liquid crystal layer between two substrates. The transmittance of the liquid crystal layer may be changed according to an electric field formed between a pixel electrode and a common electrode. For example, the liquid crystal layer may include a liquid crystal of IPS mode, ECB mode or TN mode. A linear polarizer 310 and 320 may be disposed an outer surface of the liquid crystal panel 100. For example, the liquid crystal panel 100 may be disposed between a first linear polarizer 310 and a second linear polarizer 320. The transmission axis of the second linear polarizer 320 may be perpendicular to the transmission axis of the first linear polarizer 310.

The back-light unit 200 may provide light to the liquid crystal panel 100. For example, the back-light unit 200 may include a light-source element 210, a first light-guide plate 221 and a second light-guide plate 222. The second light-guide plate 222 may be disposed on the first light-guide plate 221. The light-source element 210 may emit light to the first light-guide plate 221 and/or the second light-guide plate 222. For example, the light-source element 210 may include a first light-source 211 disposed on a side of the first light-guide plate 221 and a second light-source 212 disposed on a side of the second light-guide plate 222. The second light-source 212 may be mounted on the same light-source circuit board 213 as the first light-source 211. For example, the light-source circuit board 213 of the light-source element 210 may extend on to the side of the second light-guide plate 222 from the side of the first light-guide plate 221. The light-source circuit board 213 may include an intermediate region MA disposed between a first light-source region LA1 in which the first light-source 211 is mounted and a second light-source region LA2 in which the second light-source 212 is mounted.

The first light-guide plate 221 and the second light-guide plate 222 may function as a surface light-source. For example, the light incident on the first light-guide plate 221 by the first light-source 211 may emit through entire upper surface of the first light-guide plate 221 toward the second light-guide plate 222, and the light incident on the second light-guide plate 222 by the second light-source 212 may emit through entire upper surface of the second light-guide plate 222 toward the liquid crystal panel 100. The light emitted from the upper surface of the first light-guide plate 221 may provide to the liquid crystal panel 100 passing through the second light-guide plate 222. For example, the second light-guide plate 222 may overlap the first light-guide plate 221. The liquid crystal panel 100 may be disposed on the upper surface of the second light-guide plate 222.

The back-light unit 200 may include a first optical sheet 230a between the first light-guide plate 221 and the second light-guide plate 222 and a second optical sheet 230b on the upper surface of the second light-guide plate 222. The light emitted through the upper surface of the light-guide plate 221 may have uniform characteristics by the first optical sheet 230a. For example, the first optical sheet 230a may have a stacked structure of a first diffusion sheet 231a and a first prism sheet 232a. The light emitted through the upper surface 222 may have uniform characteristics by the second optical sheet 230b. The second optical sheet 230b may have a stacked structure same as the first optical sheet 230a. For example, the second optical sheet 230b may have a stacked structure of a second diffusion sheet 231b and a second prism sheet 232b.

The back-light unit 200 may include a reflective plate 240, which is disposed on a lower surface of the first light-guide plate 221 opposite to the second light-guide plate 222. The reflective plate 240 may have a material having high reflectance. For example, the reflective plate 240 may include a metal, such as aluminum (Al) and silver (Ag). The light emitted through the lower surface of the first light-guide plate 221 may be reflected toward the second light-guide plate 222 by the reflective plate 240. Thus, in the display apparatus according to the aspect of the present disclosure, loss of the light emitted from the light-source element 210 may be minimized.

The first viewing angle control unit 410 may be disposed between the first light-guide plate 221 and the second light-guide plate 222. For example, the first viewing angle control unit 410 may be disposed between the first optical sheet 230a and the second light-guide plate 222. The first viewing angle control unit 410 may include first light-blocking patterns 413 disposed between a first lower control substrate 411 and a first upper control substrate 412. The first light-blocking patterns 413 may include a material capable of blocking light. For example, the first light-blocking patterns 413 may include a black dye, such as carbon black.

The first viewing angle control unit 410 may limit a viewing angle in a first direction X. For example, the first light-blocking patterns 413 may extend in a second direction Z perpendicular to the first direction X. Herein, the first direction X may be a left and right direction (or a horizontal direction) of the user, and the second direction Z may be an up and a down direction (or a vertical direction) of the user. For example, in the vehicle that the display apparatus DP according to the aspect of the present disclosure is installed in front of a passenger seat, the image realized by the display apparatus DP according to the aspect of the present disclosure may be not recognized by the driver sitting the driver's seat DS by the first viewing angle control unit 410. Therefore, in the display apparatus DP according to the aspect of the present disclosure, the accidents caused by the distraction of the people around the user, such as the driver may be prevented by the first viewing angle control unit 410.

The first viewing angle control unit 410 may include a first control insulating layer 414 surrounding the first light-blocking patterns 413. The first control insulating layer 414 may include an insulating material. The first control insulating layer 414 may include a transparent material. For example, the light emitted through the upper surface of the first light-guide plate 221 may pass through the first control insulating layer 414 between the first light-blocking patterns 413. A space between the first lower control substrate 411 and the first upper control substrate 412 may be completely filled by the first light-blocking patterns 413 and the first control insulating layer 414. Thus, in the display apparatus DP according to the aspect of the present disclosure, the damage and the deformation of the first light-blocking patterns 413 due to the external impact may be prevented.

A second viewing angle control unit 420 may be disposed between the back-light unit 200 and the liquid crystal panel 100. For example, the second viewing angle control unit 420 may be disposed between the second light-guide plate 222 of the back-light unit 200 and the first linear polarizer 310. The second viewing angle control unit 420 may have a stacked structure same as the first viewing angle control unit 410. For example, the second viewing angle control unit 420 may include second light-blocking patterns 423 disposed between a second lower control substrate 421 and a second upper control substrate 422. The second light-blocking patterns 423 may include a material capable of blocking light. For example, the second light-blocking patterns 423 may include a black dye, such as carbon black. The second light-blocking patterns 423 may include the same material as the first light-blocking patterns 413.

The second viewing angle control unit 420 may limit a viewing angle in the second direction Z. For example, the second light-blocking patterns 423 may extend parallel to each other in the first direction X. Each of the second light-blocking patterns 423 may vertically cross the first light-blocking patterns 413. In the vehicle that the display apparatus DP according to the aspect of the present disclosure is installed in front of a passenger seat, the reflection of the image by a front window FW may be prevented by the second viewing angle control unit 420. Therefore, in the display apparatus DP according to the aspect of the present disclosure, the accidents caused by the distraction of the people around the user may be effectively prevented by the second viewing angle control unit 420.

The second viewing angle control unit 420 may include a second control insulating layer 424 surrounding the second light-blocking patterns 423. The second control insulating layer 424 may include an insulating material. The second control insulating layer 424 may include a transparent material. For example, the second control insulating layer 424 may include the same material as the first control insulating layer 414. The light emitted through the upper surface of the second light-guide plate 222 may pass through the second control insulating layer 424 between the second light-blocking patterns 423. A space between the second lower control substrate 421 and the second upper control substrate 422 may be completely filled by the second light-blocking patterns 423 and the second control insulating layer 424. Thus, in the display apparatus DP according to the aspect of the present disclosure, the damage and the deformation of the second light-blocking patterns 423 due to the external impact may be prevented.

The first viewing angle control unit 410 and the second light-guide plate 222 may be supported by a supporting element 500. For example, the supporting element 500 may be disposed between an edge of the first light-guide plate 221 and an edge of the first viewing angle control unit 410. For example, a lower surface of the first viewing angle control unit 410 toward the first light-guide plate 221 may include a region being in contact with the supporting element 500. The supporting element 500 may have a bar shape extending along the edge of the first viewing angle control unit 410. The first viewing angle control unit 410 may be spaced away from the first optical sheet 230a by the supporting element 500. For example, an air-gap AG may be disposed between the first optical sheet 230a and the first viewing angle control unit 410. The air-gap AG may be disposed side by side with the supporting element 500. Thus, in the display apparatus DP according to the aspect of the present disclosure, an optical path for the first optical sheet 230a may be sufficiently secured.

The supporting element 500 may press an edge of the first optical sheet 230a. For example, an upper surface of the first optical sheet 230a toward the first viewing angle control unit 410 may include a region being in contact with the supporting element 500. The air-gap AG disposed between the first optical sheet 230a and the first viewing angle control unit 410 may have a vertical distance same as a thickness of the supporting element 500. Thus, in the display apparatus DP according to the aspect of the present disclosure, the mobility of the first optical sheet 230a may be prevented by the supporting element 500.

The supporting element 500 may be coupled to the light-source element 210. For example, the supporting element 500 may be attached to a surface of the light-source circuit board 213 between the first light-source 211 and the second light-source 212 by using surface mount technology (SMT). The supporting element 500 may include a metal. The supporting element 500 may be in contact with the intermediate region MA of the light-source circuit board 213. Thus, in the display apparatus DP according to the aspect of the present disclosure, particles generated during a coupling process of the supporting element 500 may be minimized.

The back-light unit 200 may include a cover bottom 250 accommodating the light-source element 210, the first light-guide plate 221, the second light-guide plate 222, the first optical sheet 230a, the second optical sheet 230b, the reflective plate 240, the first viewing angle control unit 410 and the supporting element 500. For example, the cover bottom 250 may include a bottom portion 251 supporting the reflective plate 240 and a side wall 252 extending toward the liquid crystal panel 100 from an edge of the bottom portion 251. The side wall 252 of the cover bottom 250 may be disposed on a side of the first light-guide plate 221 and a side of the second light-guide plate 222. The light-source circuit board 213 of the light-source element 210 may be fixed to the cover bottom 250. For example, the light-source circuit board 213 may be attached to the side wall 252 of the cover bottom 250 by a substrate adhesive layer 260. Thus, in the display apparatus DP according to the aspect of the present disclosure, the generation of the particles during a coupling process of the light-source element 210 may be prevented.

An edge of the second optical sheet 230b may be pressed by a guide panel 270. For example, the second viewing angle control unit 420 and the liquid crystal panel 100 may be stacked on the guide panel 270. The guide panel 270 may be coupled to the cover bottom 250. For example, the guide panel 270 may include a flat plate portion 271 having a region being in contact with an edge of the second optical sheet 230b and a coupling portion 272 extending on the side wall 252 of the cover bottom 250.

Figure 7A:
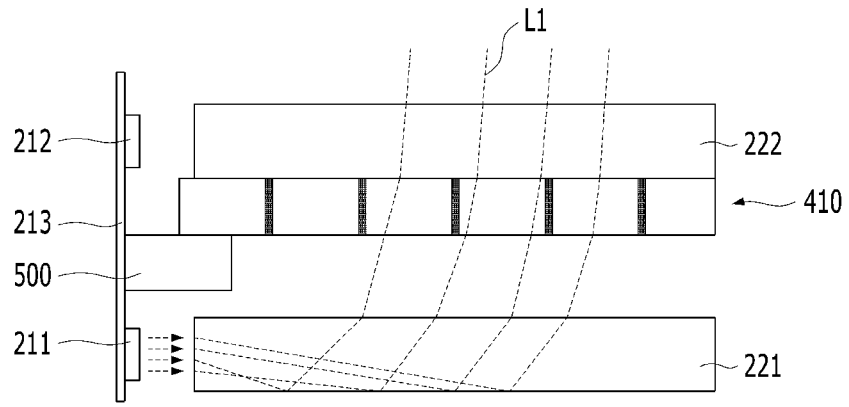
FIGS. 7A and 7B are views showing a travelling direction of light emitted from the back-light unit according to a change of a viewing angle in the display apparatus according to the aspect of the present disclosure.

FIG. 7A is a view showing a travelling direction of light emitted from the back-light unit 200, when the viewing angle is limited, such that the image realized by the display apparatus DP according to the aspect of the present disclosure is not recognized by the people around the user.

Referring to FIGS. 1 to 6 and 7A, in the display apparatus DP according to the aspect of the present disclosure, the light emitted from the first light-source 211 may be incident on the first light-guide plate 221, and the second light-source 212 may not emit light. Thus, in the display apparatus DP according to the aspect of the present disclosure, the light L1 in which the viewing angle in the first direction X is limited by the first viewing angle control unit 410 may provide to the second viewing angle control unit 420 passing through the second light-guide plate 221. Therefore, in the display apparatus DP according to the aspect of the present disclosure, the viewing angle in the first direction X may be limited by the first viewing angle control unit 410, and the image realized by the light in which the viewing angle in the second direction Z perpendicular to the first direction X is limited by the second viewing angle control unit 420 may provide to the user. That is, in the display apparatus DP according to the aspect of the present disclosure, the realized image may be not recognized by the people around the user, such as the driver.

Figure 7B:
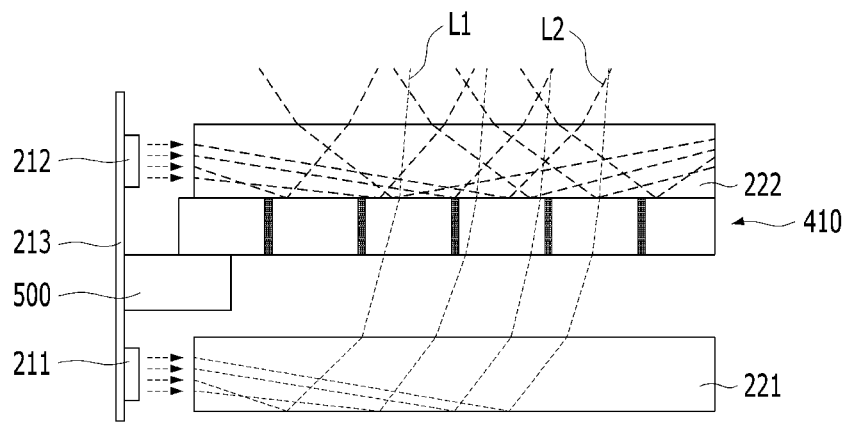

FIG. 7B is a view showing a travelling direction of light emitted from the back-light unit 200, when sharing the image realized by the display apparatus DP according to the aspect of the present disclosure with the people around the user.

Referring to FIGS. 1 to 6 and 7B, in the display apparatus DP according to the aspect of the present disclosure, the light emitted from the first light-source 211 may be incident to the first light-guide plate 221, and the light emitted from the second light-source 212 may be incident to the second light-guide plate 222. Thus, in the display apparatus DP according to the aspect of the present disclosure, the light L1 in which the viewing angle in the first direction X is limited by the first viewing angle control unit 310 may provide to the second viewing angle control unit 420 with the light L2 in which the viewing angle in the first direction X is not limited through the second light-guide plate 221. That is, in the display apparatus DP according to the aspect of the present disclosure, the viewing angle only in the second direction Z perpendicular to the first direction X may be limited by the second viewing angle control unit 420. Therefore, in the display apparatus DP according to the aspect of the present disclosure, the realized image may be shared with the people adjacent to the user in the first direction X, such as the driver sitting in the driver's seat DS.

Accordingly, the display apparatus DP according to the aspect of the present disclosure may include the back-light unit 200 having the light-source element 210, the first light-guide plate 221 and the second light-guide plate 222, the liquid crystal panel 100 on the second light-guide plate 222 of the back-light unit 200, and the first viewing angle control unit 410 between the first light-guide plate 221 and the second light-guide plate 222 of the back-light unit 200, wherein the supporting element 500 supporting the first viewing angle control unit 410 and the second light-guide plate 222 may be in contact with the surface of the light-source circuit board 213 of the light-source element 210. Thus, the display apparatus DP according to the aspect of the present disclosure may minimize the generation of the particles during the coupling process of the supporting element 500. And, in the display apparatus DP according to the aspect of the present disclosure, the supporting element 500 may be accommodated in the cover bottom 250, in the state coupled to the light-source circuit board 213. That is, in the display apparatus DP according to the aspect of the present disclosure, the particles generated during the coupling process of the supporting element 500 may not affect the light emitted from the back-light unit 200. Therefore, in the display apparatus DP according to the aspect of the present disclosure, the viewing angle may be selectively limited by controlling the first light-source 211 disposed on the side of the first light-guide plate 221 and the second light-source 212 disposed on the side of the second light-guide plate 222, and the deterioration of the image quality due to the coupling process of the supporting element 500 may be prevented.

Figure 8:
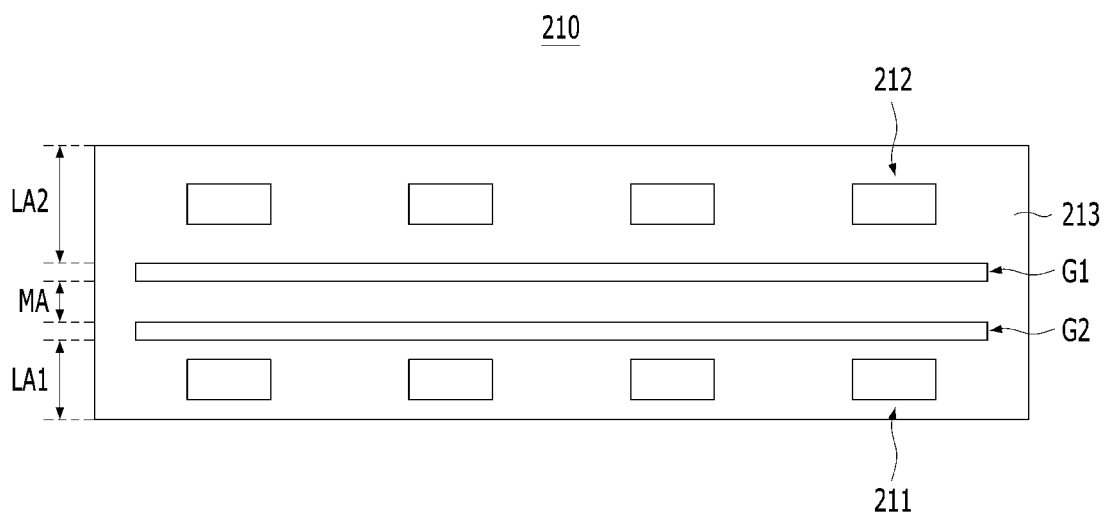
FIGS. 8, 9A-9C, 10 and 11 are views showing the display apparatus according to another aspect of the present disclosure.

The display apparatus DP according to the aspect of the present disclosure is described that the light-source circuit board 213 has a shape of single plate. However, in the display apparatus according to another aspect of the present disclosure, the light-source circuit board 213 of various shape may be used. For example, in the display apparatus according to another aspect of the present disclosure, the light-source circuit board 213 may include a first gap G1 disposed between the first light-source 211 mounted in the first light-source region LA1 and the intermediate region MA and a second gap G2 disposed between the second light-source 212 mounted in the second light-source region LA2 and the intermediate region MA, as shown in FIG. 8. Thus, in the display apparatus according to another aspect of the present disclosure, the particles generated during a process of attaching the supporting element 500 to the intermediate region MA of the light-source circuit board 213 may be not moved toward the first light-source 211 and the second light-source 212. That is, in the display apparatus according to another aspect of the present disclosure, the damage of the first light-source 211 and the second light-source 212 due to the particles generated during the coupling process of the supporting element 500 may be prevented. And, in the display apparatus according to another aspect of the present disclosure, the particles generated during the coupling process of the supporting element 500 may be easily removed by using the first gap G1 and the second gap G2. Therefore, in the display apparatus according to another aspect of the present disclosure, it is possible to effectively prevent the particles generated during the coupling process of the supporting element 500 from being recognized by the user as a dark spot.

Figure 9A:
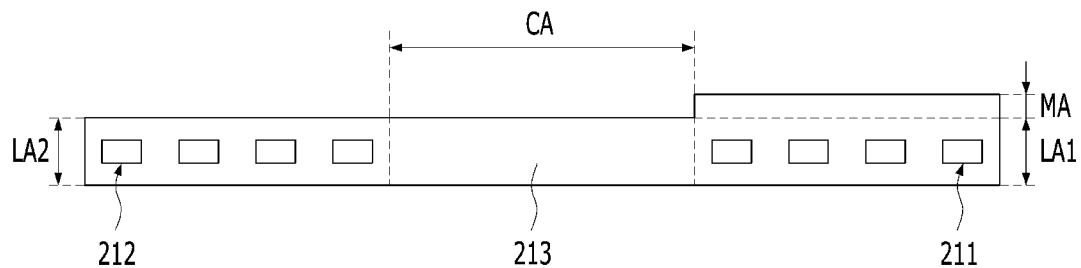
Figure 9B:
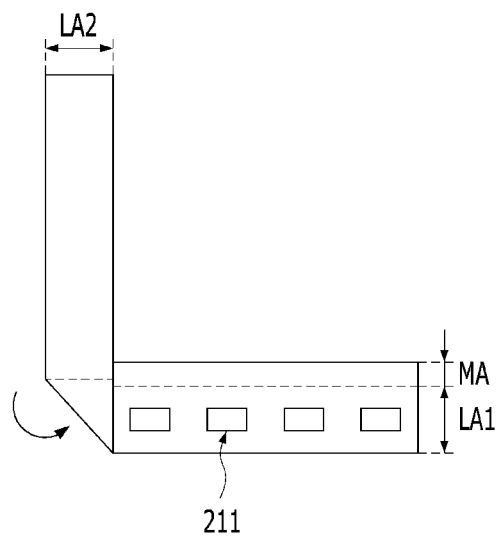
Figure 9C:
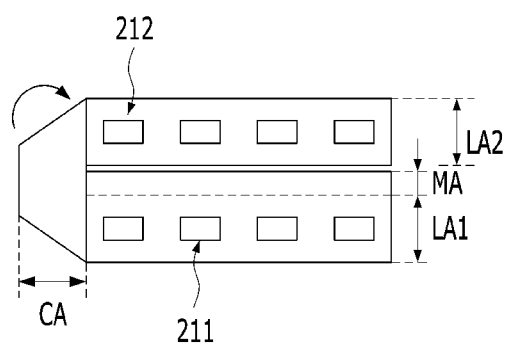

The display apparatus DP according to the aspect of the present disclosure is described that the light-source circuit board 213 has a shape extending onto the side of the second light-guide plate 222 from the side of the first light-guide plate 221. However, the display apparatus according to another aspect of the present disclosure may include the light-source circuit board 213 having a strip-shape. For example, in the display apparatus according to another aspect of the present disclosure, the light-source circuit board 213 may include a connecting region CA disposed between a side of the first light-source region LA1 and a side of the second light-source region LA2, the connecting region CA of the light-source circuit board 213 having a strip shape may be folded twice, so that the second light-source region LA2 may be disposed on the first light-source region LA1, as shown in FIGS. 9A to 9C. The intermediate region MA in which the supporting element 500 contacts may be in contact with the first light-source region LA1. For example, the second light-source region LA2 disposed on the first light-source region LA1 by the folding of the connecting region CA may be spaced away from the intermediate region MA. Thus, in the display apparatus according to another aspect of the present disclosure, the degree of freedom for the shape of the light-source circuit board 213 may be improved.

Figure 10:
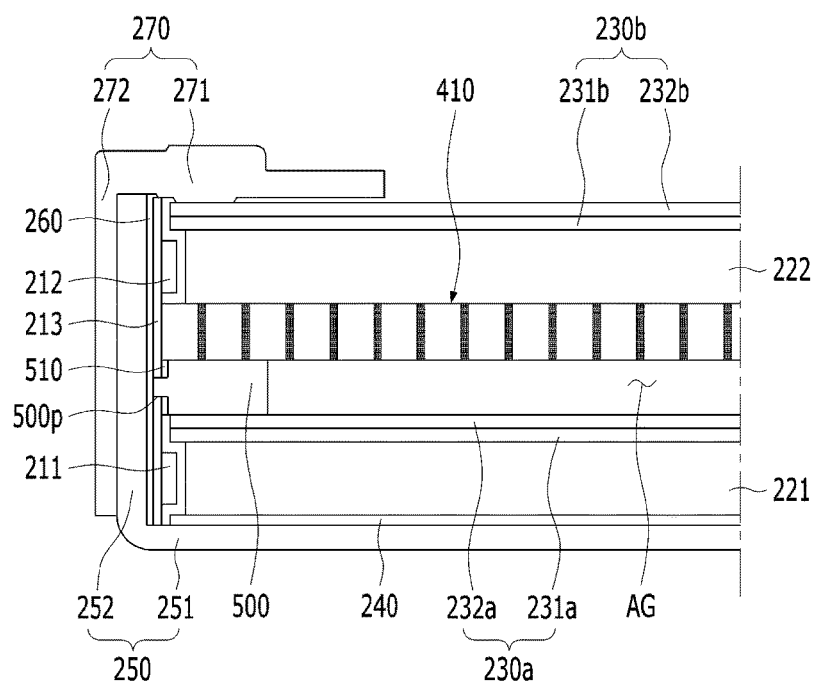
Figure 11:
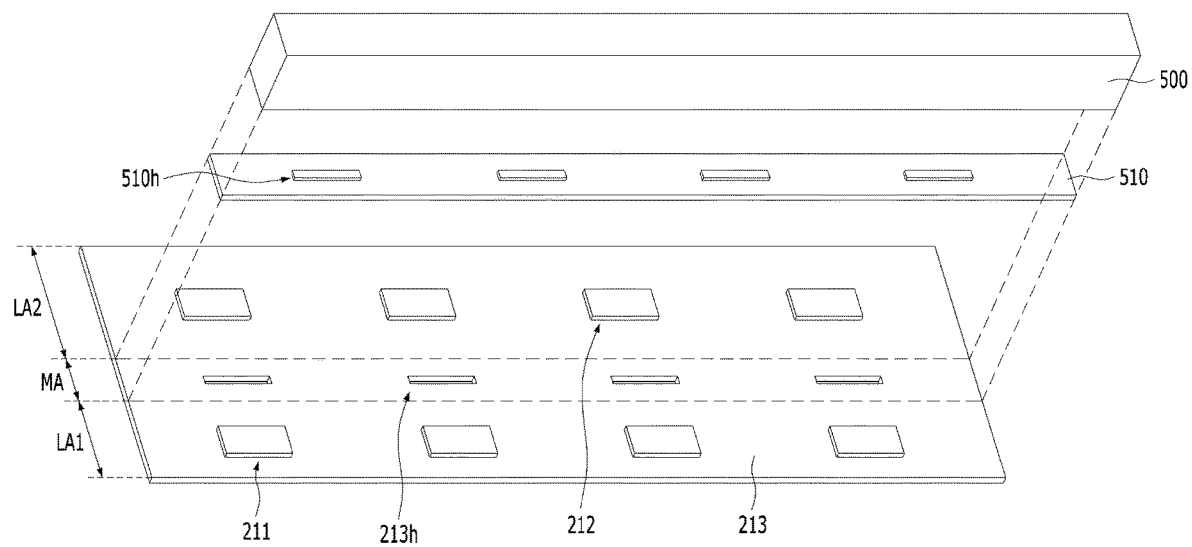

The display apparatus DP according to the aspect of the present disclosure is described that the supporting element 500 is attached to the intermediate region MA of the light-source circuit board 213 by using the surface mount technology (SMT). However, in the display apparatus according to another aspect of the present disclosure, the supporting element 500 may be coupled to the light-source circuit board 213 in various ways. For example, in the display apparatus according to another aspect of the present disclosure, the intermediate region MA of the light-source circuit board 213 in which the first light-source 211 and the second light-source 212 are mounted may include at least one coupling hole 213h, and the supporting element 500 may include at least one protruding portion 500p fastened to the coupling hole 213h, as shown in FIGS. 10 and 11. For example, the supporting element 500 may include an insulating material that is easy to process, such as plastic. Thus, in the display apparatus according to another aspect of the present disclosure, the degree of freedom for the material of the supporting element 500 may be improved.

An element adhesive layer 510 may be disposed between the intermediate region MA of the light-source circuit board 213 and the supporting element 500. The element adhesive layer 510 may include an adhesive material. For example, the supporting element 500 may be coupled to the light-source circuit board 213 by the protruding portion 500p and the element adhesive layer 510. The element adhesive layer 510 may surround the protruding portion 500p of the supporting element 500. For example, the element adhesive layer 510 may include at least one penetrating hole 510h disposed in an area corresponding to the coupling hole 213h of the light-source circuit board 213. The protruding portion 500p of the supporting element 500 may pass through the penetrating hole 510h. Thus, in the display apparatus according to another aspect of the present disclosure, the particles generated during the coupling process of the supporting element 500 may be attached to the element adhesive layer 510. That is, in the display apparatus according to another aspect of the present disclosure, the particles generated during the coupling process of the supporting element 500 may be not moved toward the first light-guide plate 221 and/or the second light-guide plate 222. Thus, in the display apparatus according to another aspect of the present disclosure, the deterioration of the image quality due to the particles generated during the coupling process of the supporting element 500 may be prevented.

In the result, the display apparatus according to the aspects of the present disclosure may include the back-light unit in which the second light-guide plate is disposed on the first light-guide plate, the viewing angle control unit between the first light-guide plate and the second light-guide plate of the back-light unit, and the supporting element supporting the viewing angle control unit and the second light-guide plate, wherein the supporting element may be in contact with the surface of the light-source circuit board in which the light-sources of the back-light unit are mounted. Thus, in the display apparatus according to the aspects of the present disclosure, the particles generated during the coupling process of the supporting element may not affect the light emitted from the back-light unit. Thereby, in the display apparatus according to the aspects of the present disclosure, the quality of the image may be improved.

What is claimed is:

1. A display apparatus comprising:
 a back-light unit including a second light-guide plate disposed on a first light-guide plate and a light-source element;
 a liquid crystal panel on the second light-guide plate of the back-light unit;
 a first viewing angle control unit disposed between the first light-guide plate and the second light-guide plate of the back-light unit, the first viewing angle control unit including first light-blocking patterns; and
 a supporting element disposed between an edge of the first light-guide plate and an edge of the first viewing angle control unit,
 wherein the light-source element includes a first light-source on a side of the first light-guide plate, a second light-source on a side of the second light-guide plate, and a light-source circuit board in which the first light-source and the second light-source are mounted, and
 wherein the supporting element is in contact with a surface of the light-source circuit board between the first light-source and the second light-source.

2. The display apparatus according to claim 1, wherein the supporting element includes a metallic material.

3. The display apparatus according to claim 1, wherein a lower surface of the first viewing angle control unit toward the first light-guide plate includes a region being in contact with the supporting element.

4. The display apparatus according to claim 1, wherein the back-light unit further includes an optical sheet between the first light-guide plate and the first viewing angle control unit, and
 wherein an upper surface of the optical sheet toward the first viewing angle control unit includes a region being in contact with the supporting element.

5. The display apparatus according to claim 1, wherein the light-source circuit board includes a first light-source region in which the first light-source is mounted, a second light-source region in which the second light-source is mounted, and an intermediate region between the first light-source region and the second light-source region,
 wherein the supporting element is in contact with the intermediate region of the light-source circuit board, and
 wherein the second light-source region is spaced away from the intermediate region.

6. The display apparatus according to claim 5, wherein the intermediate region is in contact with the first light-source region.

7. The display apparatus according to claim 5, wherein the light-source circuit board further includes a connecting region being in contact with a side of the first light-source region and a side of the second light-source region.

8. The display apparatus according to claim 1, further comprising a second viewing angle control unit disposed between the back-light unit and the liquid crystal panel,
 wherein the second viewing angle control unit includes second light-blocking patterns extending in a direction perpendicular to the first light-blocking patterns.

9. A display apparatus comprising:
 at least one first light-source on a side of a first light-guide plate;
 a viewing angle control unit disposed on the first light-guide plate, the viewing angle control unit including light-blocking patterns;
 a second light-guide plate on the viewing angle control unit, the second light-guide plate overlapping with the first light-guide plate;
 at least one second light-source on a side of the second light-guide plate;
 a liquid crystal panel on the second light-guide plate;
 a light-source circuit board including an intermediate region between a first light-source region in which the first light-source is mounted and a second light-source region in which the second light-source is mounted; and
 a supporting element being in contact with the intermediate region of the light-source circuit board, the supporting element extending between an edge of the first light-guide plate and an edge of the viewing angle control unit.

10. The display apparatus according to claim 9, further comprising a cover bottom accommodating the first light-guide plate, the first light-source, the viewing angle control unit, the second light-guide plate, the second light-source, the light-source circuit board and the supporting element,
 wherein the cover bottom includes a side wall disposed on a side of the first light-guide plate and a side of the second light-guide plate, and wherein the light-source circuit board is attached to the side wall of the cover bottom by a substrate adhesive layer.

11. The display apparatus according to claim 9, wherein the intermediate region of the light-source circuit board includes at least one coupling hole, and
wherein the supporting element includes at least one protruding portion which is fastened to the coupling hole of the light-source circuit board.

12. The display apparatus according to claim 11, further comprising an element adhesive layer disposed between the light-source circuit board and the supporting element,
wherein the element adhesive layer includes at least one penetrating hole through which the protruding portion of the supporting element passes.

13. The display apparatus according to claim 11, wherein the supporting element includes an insulating material.

14. The display apparatus according to claim 9, wherein the supporting element has a bar shape extended along an edge of the viewing angle control unit.

15. The display apparatus according to claim 9, further comprising an air-gap disposed between the first light-guide plate and the viewing angle control unit,
wherein the air-gap is disposed side by side with the supporting element.

* * * * *